US008687056B2

(12) United States Patent
Yahav et al.

(10) Patent No.: US 8,687,056 B2
(45) Date of Patent: Apr. 1, 2014

(54) AIRCRAFT LANDING ASSISTANCE (75) Inventors: Dror Yahav, Haifa (IL); Yaron Kranz, Haifa (IL); Asaf Ashkenazi, Haifa (IL); Itai Orenstein, Haifa (IL); Tal Waisman, Haifa (IL); Mike Abrahami, Haifa (IL)

(73) Assignee: Elbit Systems Ltd., Haifa (IL)

( * ) Notice: Subject to any disclaimer, the term of this patent is extended or adjusted under 35 U.S.C. 154(b) by 909 days.

(21) Appl. No.: 12/669,293

(22) PCT Filed: Jul. 15, 2008

(86) PCT No.: PCT/IL2008/000979
§ 371 (c)(1),
(2), (4) Date: Apr. 28, 2010

(87) PCT Pub. No.: WO2009/010969
PCT Pub. Date: Jan. 22, 2009

(65) Prior Publication Data
US 2010/0231705 A1 Sep. 16, 2010

Related U.S. Application Data (60) Provisional application No. 60/959,969, filed on Jul. 18, 2007.

(51) Int. Cl.
*H04N 7/18* (2006.01)
(52) U.S. Cl.
USPC .......................................................... 348/115
(58) Field of Classification Search
None
See application file for complete search history.

(56) References Cited

U.S. PATENT DOCUMENTS

| 5,072,218 | A | * | 12/1991 | Spero et al. | 340/980 |
|---|---|---|---|---|---|
| 6,061,068 | A | | 5/2000 | Hoffman, II et al. | |
| 6,232,602 | B1 | | 5/2001 | Kerr | |
| 6,297,749 | B1 | | 10/2001 | Smith | |
| 6,373,055 | B1 | * | 4/2002 | Kerr | 250/330 |
| 6,731,226 | B2 | | 5/2004 | Walter | |
| 7,091,881 | B2 | | 8/2006 | Judge et al. | |
| 7,196,329 | B1 | * | 3/2007 | Wood et al. | 250/330 |
| 7,312,725 | B2 | * | 12/2007 | Berson et al. | 340/980 |
| 7,737,867 | B2 | * | 6/2010 | Arthur et al. | 340/980 |
| 2002/0126066 | A1 | * | 9/2002 | Yasukawa et al. | 345/8 |
| 2005/0213805 | A1 | * | 9/2005 | Blake et al. | 382/137 |

FOREIGN PATENT DOCUMENTS

WO 03/060830 A1 7/2003

* cited by examiner

*Primary Examiner* — Sath V Perungavoor
*Assistant Examiner* — Kate Luo
(74) *Attorney, Agent, or Firm* — Edwards Wildman Palmer LLP; Steven M. Jensen (57) ABSTRACT

Enhanced vision system for assisting aircraft piloting, the system including a line-of-sight detector for determining the line-of-sight of the pilot of the aircraft, a head mounted display (HMD) worn by the pilot, and a processor which receives the determined line-of-sight from the line-of-sight detector, receives a spatial image of the external scene to the aircraft, generates symbolic information respective of the aircraft piloting, and superimposes the symbolic information onto the spatial image to produce a combined spatial and symbolic image, the HMD displaying the combined spatial and symbolic image to the pilot in real-time, in alignment with the determined line-of-sight. The spatial image may be an image combined from a sensor image and a synthetic image. A communication interface may be coupled to the HMD allowing the pilot to receive and confirm flight instructions.

24 Claims, 8 Drawing Sheets

AIRCRAFT LANDING ASSISTANCE

FIELD OF THE DISCLOSED TECHNIQUE

The disclosed technique relates to imaging and display systems for aircrafts, in general, and to an enhanced vision system and method to assist the piloting of an aircraft, in particular.

BACKGROUND OF THE DISCLOSED TECHNIQUE

A major objective for airlines and airport management is to increase the overall flight capacity, by limiting the number of missed and delayed flights, while maintaining a sufficient level of flight safety. Each delayed flight has a tremendous economic cost, as well as being a severe inconvenience for the passengers and flight crew. If for example a pilot experiences poor visibility when approaching the runway prior to landing, the aircraft landing may need to be delayed, or the flight rerouted to another destination. Likewise, if there is known to be poor visibility at the destination region, the aircraft take-off may be cancelled or delayed, disrupting the original flight schedule as well as impacting the scheduling of other planned flights. Poor visibility is generally the result of fog, but other inclement weather conditions, such as rain, snow, sleet, dust storms or smoke, can also restrict visibility in the surrounding environment. Moreover, besides causing flight delays, poor visibility for the pilot has serious safety implications and increases the likelihood of an accident occurring.

The large expansion of air travel in recent years and corresponding increase in the level of air traffic, a trend which appears to continue in the future, only intensifies the safety repercussions of poor visibility weather conditions. Recent developments in the aviation world has also seen the introduction of the very light jet (VLJ), a small jet aircraft flown by a single pilot and carrying only a handful of passengers. The VLJ is relatively inexpensive as compared to the larger commuter aircrafts, and is projected to capture a substantial portion of the market for air travel, which will serve to exacerbate air traffic and associated logistic problems. These smaller aircrafts are also associated with a greater likelihood of flight problems and accidents, as the pilots tend to be less trained and experienced, and are usually operating in less equipped airfields. Furthermore, the air traffic controllers and other flight control personnel are required to devote an extra amount of time dealing with such flights to ensure that everything proceeds safely. This prevents the air traffic controllers from handling other flights, thereby limiting the overall flight capacity, contributing to further escalation of the air traffic congestion at airports.

Several existing systems are designed to improve flight safety and enhance situational awareness by providing supplemental visual data to the pilot. The visual data may be projected onto a head-up display (HUD) or a head-down display. The data may include an enhanced image of the external environment in front of the aircraft, as well as relevant flight and navigational information. For example, an enhanced vision system (EVS) projects an image onto a HUD, such that the pilot sees the projected image overlayed in a conformal manner over the outside view. This enables the pilot to see features (such as runways, landing approach markers, other aircrafts, mountains, buildings, and other terrain), which otherwise could not be seen during night and low visibility conditions. The image may be obtained using an external imaging device, which detects light outside the visible range, such as a forward looking infrared (FLIR) camera. The image may also be obtained from a database containing predefined images of the surrounding environment. The image may further incorporate data link information.

Systems which display visual data in a two-dimensional (2D) format, such as head down displays, offer somewhat limited situational awareness, as it is difficult for the pilot to translate a 2D image representation into a real world three-dimensional (3D) comprehension. While providing limited situational awareness, head-down displays also increase the pilot workload, due to the diversion of the pilot line-of-sight and attention to a separate display. While head-up displays can deliver local real world situational awareness with a decreased workload, they generally provide only a limited field of view. Consequently, many areas which may contain important information for the pilot (or where important information should be displayed) are essentially blocked from view, thereby limiting the overall situational awareness.

Flight errors may occur due to miscommunication between the air traffic controller and the pilot. The air traffic controller may send instructions or flight information to the pilot, but the pilot may not fully understand or correctly interpret the received information. The air traffic controller utilizes a 2D image representation to generate the flight instructions, whereas the pilot must translate these instructions into the real world 3D environment. The need to translate the information into a verbal format inevitably introduces errors of precision or interpretation. Even when confirmation is performed, verbally or through other means, there is no guarantee that the instructions were correctly understood. The two sides may have different perspectives with respect to the same set of instructions.

PCT International Publication No. WO2007/006762 to Thales, entitled "Optoelectronic device for assisting aircraft taxiing comprising dedicated imaging", is directed to a device for assisting aircraft taxiing on an airport traffic lane. A Head-Up collimator displays symbology superimposed on the out-the-window scene in the visual field of the pilot. A calculator dedicated to the collimator generates the symbology, which can be divided into 2D symbols and 3D symbols. The 3D symbols include the axial marks of the traffic lane and the lateral safety marks of the traffic lane, and are superimposed exactly on the external elements they represent. The axial marks are depicted as a series of rectangular forms arranged at regular intervals, representing the center line of the traffic lane. The lateral safety marks are depicted as plots at regular intervals, representing the external limit or boundary of the traffic lane. During bends in the traffic lane, the lateral safety marks are depicted as plots of variable height on the outside of the bend. The height of the plots increases gradually during the beginning of the bend, remains constant until the end of the bend, and then decreases gradually following the bend. The height of the plots is lower than the eye level of the pilot above the traffic lane, such that all the plots appear under a depicted horizon line. The 2D symbols include symbols representing a change of direction, the location of the main undercarriage, and an aerial view of the aircraft location on the bend. The set of symbols representing a change of direction include: a curved arrow, indicating the bend direction and curve angle; the name of the following traffic lane; and a text indication of the bend along with the remaining distance to complete the bend. The set of symbols representing the location of the main undercarriage include: a model of the aircraft undercarriage that encompasses the bogies; a representation of the traffic lane on the same scale as the undercarriage model; and markings representing the ideal location of the external edges of the bogies when the aircraft is centered on the traffic lane. The set of symbols representing the aerial view of the aircraft location on the bend, main undercarriage include: rectangle-shaped marks arranged at regular intervals representing the center line of the traffic lane; lateral safety marks of the traffic line; an undercarriage model representing an aerial view of the undercarriage and the front wheel; and an aircraft model representing an aerial view of the aircraft.

U.S. Pat. No. 6,119,055 to Richman, entitled "Real time imaging system and method for use in aiding a landing operation of an aircraft in obscured weather conditions", is directed to an apparatus and method for aiding an operator of an aircraft in visualizing a runway during inclement weather conditions. The apparatus includes a plurality of LED assemblies disposed on opposite sides of the runway; a radio frequency (RF) transmitter disposed on a tower near the end of the runway; and an imaging system mounted on the aircraft. Each of the LED assemblies includes a plurality of LEDs, a current driver circuit and an RF receiver. The imaging system includes an RF receiver, a processor, a camera and a display. The RF transmitter transmits RF signals toward the LED assemblies, causing the RF receiver to signal the driver circuit to energize the LEDs intermittently, in synchronization with the carrier frequency of the RF signal. As the aircraft approaches the runway, the imaging system receives the RF signals transmitted by the RF transmitter. The RF receiver of the imaging system signals the processor, which controls the operation of the camera (e.g., a CCD) in synchronization with the RF signal, such that the time and duration the camera is turned on matches the time and duration the LED is energized, at twice the frequency. In particular, the first frame captured by the camera occurs when the LEDs are turned on, the second frame captured occurs when the LEDs are turned off, the third frame occurs when the LEDs are turned on, the fourth frame occurs when the LEDs are turned off, and so forth. The frames captured when the LEDs are turned on, include radiant energy from the LEDs together with radiant background energy resulting from other light sources. The frames captured when the LEDs are turned off include only the radiant background energy. The processor (e.g., a frame grabber) receives all the frames captured by the camera, and subtracts (pixel by pixel) the digital information of each frame taken when the LEDs are turned off, from the digital information of the previous frame. The display (e.g., a HUD) presents the resultant filtered image, which includes only the light generated by the LEDs. The displayed image provides the pilot with an ability to discern the runway at a further distance away during inclement weather conditions, also known as an increased runway visible range (RVR).

U.S. Pat. No. 6,232,602 to Kerr entitled "Enhanced vision system sensitive to infrared radiation", is directed to an enhanced vision system (EVS) for generating a graphical representation of a surrounding background scene to assist piloting an aircraft. The system includes a computer, a display (e.g., a HUD), an electric light source imager, and an ambient background scene imager. The electric light source imager detects short wavelength infrared radiation (SWIR), in the range of 1.5-1.7 µm, to obtain an image of electric navigation lights. The electric light source assembly may include a spectral filter, to optimize sensitivity and adapt to non-daylight operation. The center of each radiation source is identified (by determining the peaks or local maxima), and a video signal is generated where each peak is represented by a dot of predefined size. The ambient background scene imager detects long wavelength infrared radiation (LWIR), e.g. 8-14 µm, or alternatively medium wavelength infrared radiation (MWIR), e.g. 3-5 µm, to obtain an image of the surrounding background, such as runway edges and markings, terrain, structures and vehicles. The computer combines the video signals generated by the electric light source imager and the ambient background scene imager. The fused image is then displayed, in alignment with the pilot perspective of the real world perceived through the aircraft windshield. The system may also incorporate a visible light imager, which detects light in the range of 0.4-0.7 µm. The images may also be supplemented with a predefined database of patterns and features, along with their global location. A computer generated image based on object recognition of the patterns is fitted to the image from the sensors to add missing details, such as if atmospheric conditions prevent the sensors from sensing all the navigation lights.

U.S. Pat. No. 6,862,501 to He, entitled "Method for producing 3D perspective view avionics terrain displays", is directed to an aircraft display system and method, which displays terrain features in 3D. A plurality of sensors is arranged at predetermined intervals along a road. The system includes a graphics processor, a display element, and a plurality of data sources (e.g., a terrain database, a weather radar data source, a terrain avoidance and warning system, a navigational database, and a traffic and collision avoidance system). The processor receives inertial information (i.e., position, speed, direction), and obtains terrain data and navigational data from the databases based on the inertial information. The processor renders an image of the terrain, the navigational data, and flight path, which is displayed on the display element. The terrain is displayed with reduced detail in certain areas, in order to reduce the computational load of the processor. In particular, the terrain is initially depicted as a square patch of N×N terrain elevation data points, with each data point color-coded based on the absolute terrain elevation. The data points are connected with polygons, such as triangles, such that they appear continuous on a graphic display, thereby forming a polygon mesh. An error bound array is constructed for a triangle binary tree based square patch. The look forward viewing volume is determined based on the current location, heading, and desired viewing angle. The triangle binary tree based polygon mesh is computed, where the areas within the viewing volume use smaller error bounds, so that the triangle binary tree descends to lower levels to show more detail. The terrain color texture map is loaded onto the terrain polygon mesh and displayed. The current location and heading are updated, and the process is repeated.

U.S. Pat. No. 7,091,881 to Judge et al, entitled "Integrated hover display with augmented approach to hover symbology cueing for degraded visual environmental conditions", is directed to an integrated display system for a rotary wing aircraft to facilitate approach, hover and landing in degraded visual environmental (DVE) conditions. A sensor system having a variety of sensors (e.g., a radar altimeter, an air data system, a digital map, terrain database, global positioning system) collects information from the environment. An imaging system (e.g., a FLIR camera, a video camera) acquires imagery information. A mission computer determines flight information (e.g., velocity, height above ground, ground speed, wind direction, wind speed, location of landing zone, location of other aircrafts) based on data from the sensor system. A data fusion processor combines data received from the sensor system and the mission computer. For example, the data fusion processor may generate a synthetic image, by fusing information from a sensor and an imager, to represent terrain that may not be visible under DVE conditions. The primary flight display of the aircraft includes a hover display, which displays combined symbology received from the data fusion processor, in a single integrated data set. The hover display may be implemented as a helmet mounted display and a heads up display, where the helmet mounted display provides the pilot with visual information overlayed on the outside scene and stabilized using a head-tracking device. The symbology displayed by the hover display may include, for example, aircraft location relative to the desired landing point, aircraft velocity, acceleration, altitude, rate of descent, the presence and location of terrain obstacles, as well as indications of heading drift and lateral drift. The symbology also provides predictive information, such as the altitude at a future point, by means of an altitude ascent/descent tape. Certain symbols may be color coded, to indicate where the associated quantity lies with respect to acceptable limits.

SUMMARY OF THE DISCLOSED TECHNIQUE

In accordance with the disclosed technique, there is thus provided an enhanced vision system for assisting aircraft piloting. The system includes a line-of-sight detector, a head mounted display (HMD) and a processor. The processor is coupled with the line-of-sight detector and with the HMD. The HMD is worn by the pilot of the aircraft. The line-of-sight detector determines the line-of-sight of the pilot. The processor receives the determined line-of-sight, receives a spatial image of the external scene to the aircraft, generates symbolic information respective of the aircraft piloting, and superimposes the symbolic information onto the spatial image, to produce a combined spatial and symbolic image. The HMD displays the combined spatial and symbolic image to the pilot in real-time, in alignment with the determined line-of-sight.

The system may further include at least one image sensor, coupled with the processor. The image sensor acquires a sensor image of the external scene to the aircraft. The system may further include a database coupled with the processor. The database contains three dimensional (3D) image information, for generating synthetic images of the external scene. The processor receives the sensor image from the image sensor, and generates a synthetic image of the external scene from the database, in accordance with the location and heading of the aircraft. The processor selectively combines the sensor image and the synthetic image to produce the spatial image of the external scene.

In accordance with the disclosed technique, there is further provided an enhanced vision system for confirming flight instructions sent to a pilot of an aircraft by an aircraft control operator. The system includes an HMD, a communication interface, and a processor. The processor is coupled with the HMD and with the communication interface. The HMD is worn by the pilot of the aircraft. The communication interface allows the pilot to communicate from the aircraft. The aircraft control operator sends flight instructions associated with an object of interest to the pilot via the communication interface. The processor generates a visual representation of the flight instructions with the object of interest marked, respective of a combined spatial and symbolic image viewed by the pilot on the HMD. The pilot provides confirmation of the flight instructions by designating the marked object of interest on the combined spatial and symbolic image. The designation may be performed verbally or by tactile means, in conjunction with the pilot line-of-sight. If an incorrect designation is identified, the aircraft control operator verifies and resends said flight instructions or communicates with the pilot. If a correct designation is identified, the pilot proceeds to carry out said flight instructions.

In accordance with the disclosed technique, there is further provided an architecture for assisting aircraft piloting. The architecture includes an enhanced vision system and an aircraft control station. The enhanced vision system includes at least one image sensor, a database, a line-of-sight detector, a processor, an HMD, and a communication interface. The processor is coupled with the image sensor, the database, the line-of-sight detector, the HMD, and the communication interface. The HMD is worn by the pilot of the aircraft. The line-of-sight detector determines the line-of-sight of the pilot. The image sensor acquires a sensor image of the external scene to the aircraft. The database contains image information for generating a synthetic image of the external scene. The processor receives the sensor image from the image sensor, and generates a synthetic image of the external scene from the database, in accordance with the location and heading of the aircraft. The processor selectively combines the sensor image and the synthetic image to produce a spatial image of the external scene. The processor generates symbolic information respective of the aircraft piloting, and superimposes the symbolic information onto the spatial image, to produce a combined spatial and symbolic image. The HMD displays the combined spatial and symbolic image to the pilot in real-time, in alignment with the determined line-of-sight. The communication interface allows the pilot to communicate from the aircraft. The pilot confirms flight instructions received from the aircraft control station. The flight instructions are associated with an object of interest. The processor generates a visual representation of the flight instructions with the object of interest marked, respective of the combined spatial and symbolic image viewed by the pilot on the HMD. The pilot provides confirmation of the flight instructions to the aircraft control station, by designating the marked object of interest on the combined spatial and symbolic image.

In accordance with the disclosed technique, there is further provided a method for assisting aircraft piloting. The method includes the procedures of acquiring a spatial image of the external scene to the aircraft, generating symbolic information respective of the aircraft piloting, determining the line-of-sight of the pilot of the aircraft, superimposing the symbolic information onto the spatial image, to produce a combined spatial and symbolic image, and displaying the combined spatial and symbolic image in real-time onto an HMD worn by the pilot, in alignment with the determined line-of-sight. The spatial image may be selectively combined from a sensor image acquired by at least one image sensor, and a synthetic image generated from a database.

In accordance with the disclosed technique, there is further provided a method for confirming flight instructions sent to a pilot of an aircraft by an aircraft control operator. The method includes the procedures of sending flight instructions associated with an object of interest, from the aircraft control operator to the pilot, generating a visual representation of the flight instructions with the object of interest marked, respective of a combined spatial and symbolic image viewed by the pilot on an HMD, and providing confirmation of the flight instructions to the aircraft control operator by the pilot designating the marked object of interest on the combined spatial and symbolic image. The designation may be performed verbally or by tactile means, in conjunction with the pilot line-of-sight. If an incorrect designation is identified, the aircraft control operator verifies and resends said flight instructions or communicates with the pilot. If a correct designation is identified, the pilot proceeds to carry out said flight instructions.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a system and method which displays a spatial image of an external environment with superimposed symbolic information to the pilot of an aircraft. The spatial image is generated from either acquired sensor images, synthetic images stored in a database, or a fusion of both. The spatial image with the superimposed symbolic information is displayed in alignment with the line-of-sight of the pilot. The disclosed technique further provides a confirmation process, such that an air traffic controller can receive confirmation of any flight instructions or information being transmitted to the pilot, and ensure that the instructions are correctly understood. The system and method of the disclosed technique is operative to assist all stages of aircraft piloting, including take-off, flight, taxiing and landing stages.

Figure 1:
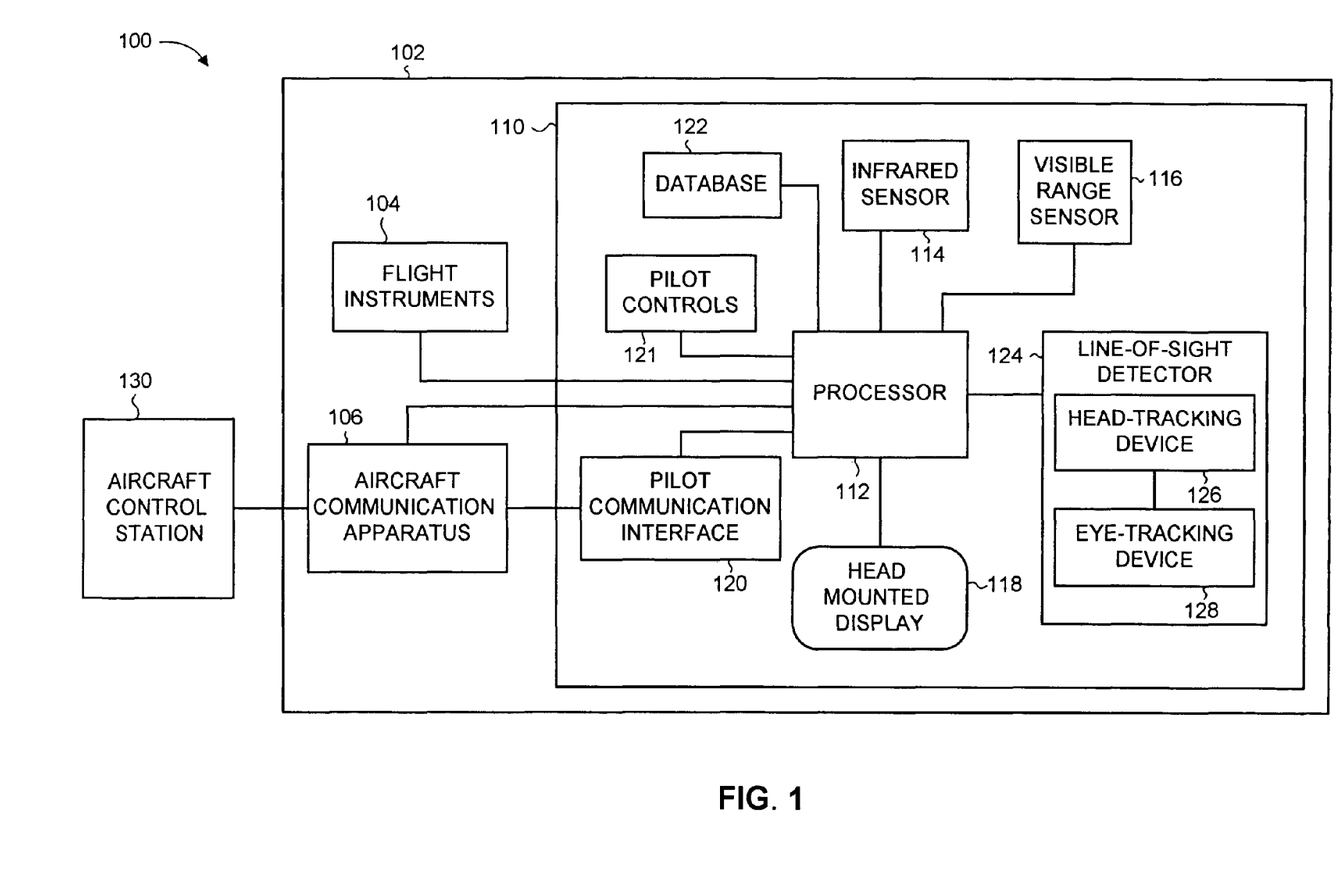
FIG. 1 is a schematic illustration of an architecture for assisting aircraft piloting, constructed and operative in accordance with an embodiment of the disclosed technique.

Reference is now made to FIG. 1, which is a schematic illustration of an architecture, generally referenced 100, for assisting aircraft piloting, constructed and operative in accordance with an embodiment of the disclosed technique. Architecture 100 includes an enhanced vision system 110 disposed inside an aircraft 102, and an aircraft control station 130. Aircraft 102 includes flight instruments 104 and aircraft communication apparatus 106. System 110 includes a processor 112, an infrared (IR) sensor 114, a visible range sensor 116, a head mounted display (HMD) 118, a pilot communication interface 120, pilot controls 121, a database 122, and a line-of-sight (LOS) detector 124. LOS detector 124 includes a head-tracking device 126 coupled with an eye-tracking device 128. Processor 112 is coupled with infrared sensor 114, with visible range sensor 116, with HMD 118, with pilot communication interface 120, with pilot controls 121, with database 122, with LOS detector 124, with flight instruments 104 and with aircraft communication apparatus 106. Pilot communication interface 120 is coupled with aircraft communication apparatus 106. Aircraft control station 130 is in communication with aircraft communication apparatus 106.

It will be appreciated that separate processors can be allocated for each element or processing function in system 100. For simplicity, the following description will refer to processor 112 as a generic processor which conducts all the necessary processing functions of system 100.

System 110 is generally installed within the cockpit of an aircraft, and is operated by a pilot. It is appreciated that the term "pilot" herein below may refer to any aircraft crew member that is required to perform flight related operations, such as receiving and performing flight instructions. The disclosed technique is applicable to any small or medium sized aviation platform, such as a small commercial aircraft (e.g. a Beechcraft B200 KingAir), a military aircraft (e.g., C-130), a very light jet (VLJ) (e.g., Eclipse 500), a helicopter (e.g., EC-135), and the like.

HMD 118 includes a display embedded within a wearable apparatus, such as a helmet, a visor, spectacles, goggles, and the like, which is worn by the pilot. HMD 118 projects a video image onto a display located directly in front of the eyes of the pilot. It is noted that HMD 118 provides sufficient eye-relief (i.e., distance between the eye and the display) to allow for use by a pilot wearing eyeglasses. In such a case, the display element is positioned beyond the eyeglasses. A display device that may be incorporated in an HMD is described in the PCT International Application Publication No. WO 2007/031986 entitled "Near Eye Display System".

Pilot communication interface 120 includes communication devices, such as a microphone, an audio speaker, an integrated headset, and the like. Aircraft communication apparatus 106 includes radio equipment, transceivers, or other devices that provide external communication to the aircraft (e.g., with a pilot of another aircraft, an operator located at aircraft control station 130, satellites or other terrestrial centers). Aircraft communication apparatus 106 also provides for internal communication within the aircraft, such as voice communication with other members of the flight crew (e.g., a co-pilot, a navigator) using an intercom. Aircraft communication apparatus 106 includes means for voice communication (e.g., via a radio) and a data link for other types of communication, such as the exchange of text or graphic messages (e.g., via a text message interface or a graphical user interface). Pilot communication interface 120 may be part of or integrated with HMD 118 (i.e., attached to the wearable apparatus), or may be a separate unit.

Database 122 contains predefined data for generating synthetic images of an environment in which aircraft is expected to be located, such as the area surrounding the runways and landing gates of different airports. In an alternative embodiment of the disclosed technique, the database is located external to the aircraft (e.g., at an aircraft control station) in communication with system 110, and the external database transmits information to system 110 during the flight.

IR sensor 114 acquires an image of the external environment surrounding the aircraft. The field of view of IR sensor 114 is at least as large as the view seen by the cockpit, and is generally sufficiently wide to provide a clear view of the landing strip and margins during landing or take-off under various wind conditions. IR sensor 114 may be any kind of imaging sensor which operates in the spectrum range of approximately 0.5-1.7 μm (spanning the near infrared to visible wavelengths). Alternatively, IR sensor 114 may have an operational range of 3-5 μm or 8-12 μm. For example, IR sensor 114 is a FLIR camera.

Visible range sensor 116 acquires an additional image of the external environment, and operates in the visible spectral range. Visible range sensor 116 and IR sensor 114 may be incorporated in a single imaging device. Visible range sensor 116 is optional, and system 110 may include only a single image sensor. In general, system 110 may include a plurality of sensors, each of which may be sensitive in a different operational spectrum. All or some of the sensors may be incorporated in a single device. The sensors may cover a range of different field of views (that may overlap), thereby providing a wider combined field of view. The sensors may be mounted on a directing unit (not shown), which provides pan and tilt operations for adjusting the coverage area. The directing unit may direct the coverage area of the sensors in real-time according to the determined line-of-sight (received from LOS detector 124). The sensors may be based on any type of sensor technology, such as gated imaging or image intensifiers.

Sensors 114 and 116 are mounted within the aircraft cockpit. It is noted that avoiding the need to mount a sensor or imaging device on the exterior of the aircraft significantly reduces expenditures, and provides for ease of installation and integration with existing aircraft systems and components. Each of sensors 114 and 116 generally operates at wavelengths that penetrate the cockpit windshield. Sensors 114 and 116 may be passive or active imaging devices. Active imaging devices transmit pulses of energy toward the region of interest, and receive the reflections from objects located in the region. The energy transmitted by the active imaging device should also include wavelengths that penetrate the cockpit windshield. Passive imaging devices merely detect the energy emitted by objects in the region of interest. Sensors 114 and 116 may be adjusted, either manually or automatically, such that their respective coverage area is aligned with the line-of-sight of the pilot (i.e., using feedback from LOS detector 124).

Processor 112 receives real-time flight information from flight instruments 104 or from another onboard flight information system. The flight information includes spatial data relating to the aircraft coordinates, for example, the location, heading, altitude, and velocity of the aircraft. The spatial data may be obtained, for example, by means of a global positioning system (GPS).

Head-tracking device 126 provides an indication of the facing direction of the pilot, based on the pilot head position. Such head-tracking devices are known in the art, as described for example in U.S. Pat. No. 4,208,725 to Lewis and in U.S. Pat. No. 4,439,755 to LaRussa. Eye-tracking device 128 determines the line-of-sight of the pilot, based on the pilot gaze, for example by determining the position of the center of the pupil with respect to the cornea or eyelids. Such eye-tracking devices are known in the art, such as described for example in U.S. Pat. No. 5,583,795 to Smyth, and in U.S. Pat. No. 5,331,149 to Spitzer et al. Alternatively, LOS detector 124 includes only head-tracking device 126 (i.e., without eye-tracking device 128).

Processor 112 receives the sensor images acquired by IR sensor 114 and visible range sensor 116. Processor 112 determines the current aircraft location and heading based on the received flight information. Processor 112 accesses database 122 and selects an appropriate synthetic image representation of the external environment, in accordance with the aircraft location and heading. Processor 112 performs image fusion of the images from all the sensors (e.g., an image generated by an external video source and an image from a synthetic vision source), to produce a single spatial image. Processor 112 superimposes additional symbolic information onto the fused spatial 3D image. The term "symbolic information" herein below refers to any type of flight, aircraft navigation or traffic related visual data or symbology, such as: aircraft location, aircraft heading, aircraft altitude, aircraft velocity, air speed, ground speed, wind velocity, vertical speed indicator (VSI), VHF Omnidirectional Range (VOR) indicator, engine status, presence of obstructions or general objects in the vicinity of the aircraft, landing destination, landing route, take-off route, taxiing route, and the like. Processor 112 forwards the combined spatial and symbolic image to HMD 118, which presents the combined spatial and symbolic image to the pilot overlayed over the view seen outside the cockpit. LOS detector 124 determines the current line-of-sight of the pilot, and processor 112 aligns the combined spatial and symbolic image on HMD 118 with the determined line-of-sight.

The term "image" is used herein below to refer to a video image or a plurality of image frames presented in sequence. The video image is displayed in real-time and continuously updated to correspond to the actual environment in relation with the current location and heading of the aircraft. The disclosed technique enables the pilot to view features, such as landing approach markers and runway lights, which would otherwise not be seen during weather conditions that result in poor visibility. If such features are not visible to the pilot, the landing may need to be delayed.

It is noted that in certain scenarios, processor 112 may utilize only the sensor images acquired by sensors 114 and 116 to generate the spatial image, or alternatively, only the synthetic image obtained from database 122. A subset of the images may be utilized for various reasons, (e.g., due to operational preferences, to limit costs, or to reduce computational complexity). For example, during good visibility conditions, processor 112 may select to use only an image acquired by visible range sensor 116. In one embodiment of the disclosed technique, if the sensor image meets a particular threshold criteria (i.e., if the quality of the sensor image is sufficiently high), then processor 112 uses only the sensor image to generate the spatial image; whereas if the sensor image fails to meets the threshold criteria, then processor 112 uses only the synthetic image (from database 122), or a combination of the sensor image and the synthetic image, to generate the spatial image. If the sensor image fails to meet another threshold criteria that is lower than the first threshold criteria, then processor 112 utilizes only the synthetic image.

According to another aspect of the disclosed technique, the system of FIG. 1 may be considered as having at least one sensor (i.e., equivalent to sensors 114 and 116), a database (i.e., equivalent to database 122), navigation means for determining the location and heading of the aircraft (e.g., via an internal aircraft control system or received externally), a selector for obtaining a synthetic image of the external scene from the database in accordance with the determined aircraft location and heading (i.e., a function performed by processor 112), image fusion means for fusing the sensor image and the synthetic image, to generate a spatial image of the external scene (i.e., a function performed by processor 112), a symbolic generator for generating symbolic information respective of the aircraft piloting (i.e., a function performed by processor 112), superimposing means for superimposing the symbolic information onto the spatial image to produce a combined spatial and symbolic image (i.e., a function performed by processor 112), a line-of-sight detector (i.e., equivalent to LOS detector 124), and an HMD (i.e., equivalent to HMD 118).

Figure 2:
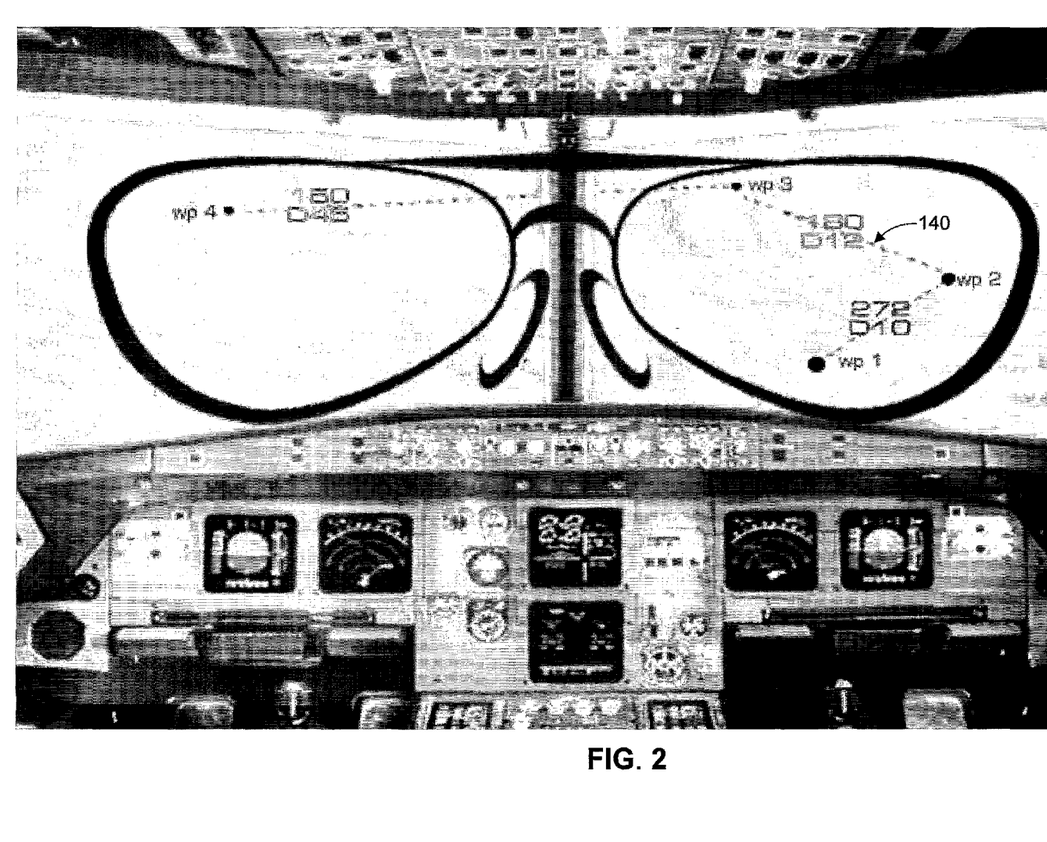
FIG. 2 is a schematic illustration of a view seen by the pilot through the HMD, constructed and operative in accordance with another embodiment of the disclosed technique.

Reference is now made to FIG. 2, which is a schematic illustration of a view seen by the pilot through the HMD, constructed and operative in accordance with another embodiment of the disclosed technique. The pilot sees a detailed view of the external environment, as projected through HMD 118 (FIG. 1). The projected spatial image allows the pilot to clearly see terrain features, such as the upcoming runway and its relation to other landmarks. The projected image also includes an exemplary landing route, referenced 140, depicted as a series of dashed lines, along with ground coordinates representing intermediate landmarks, and numerical representations of the required flight direction and altitude. Landing route 140 is superimposed precisely onto the actual terrain, such that the pilot sees route 140 in relation to the real world environment. Landing route 140 instructs the pilot to begin at coordinates wp1, then proceed in the indicated altitude and direction (272, 010) toward coordinates wp2, followed by coordinates wp3 in the indicated altitude and direction (180, 012), and finally toward coordinates wp4 in the indicated altitude and direction (150, 045). The navigational information of landing route 140 is clearly depicted on the projected image to the pilot, without obstructing the pilot view of the rest of the external environment. Furthermore, since the pilot can actually see the landing route, rather than for example having the landing route transmitted to him verbally, the landing process is facilitated considerably.

Figure 3:
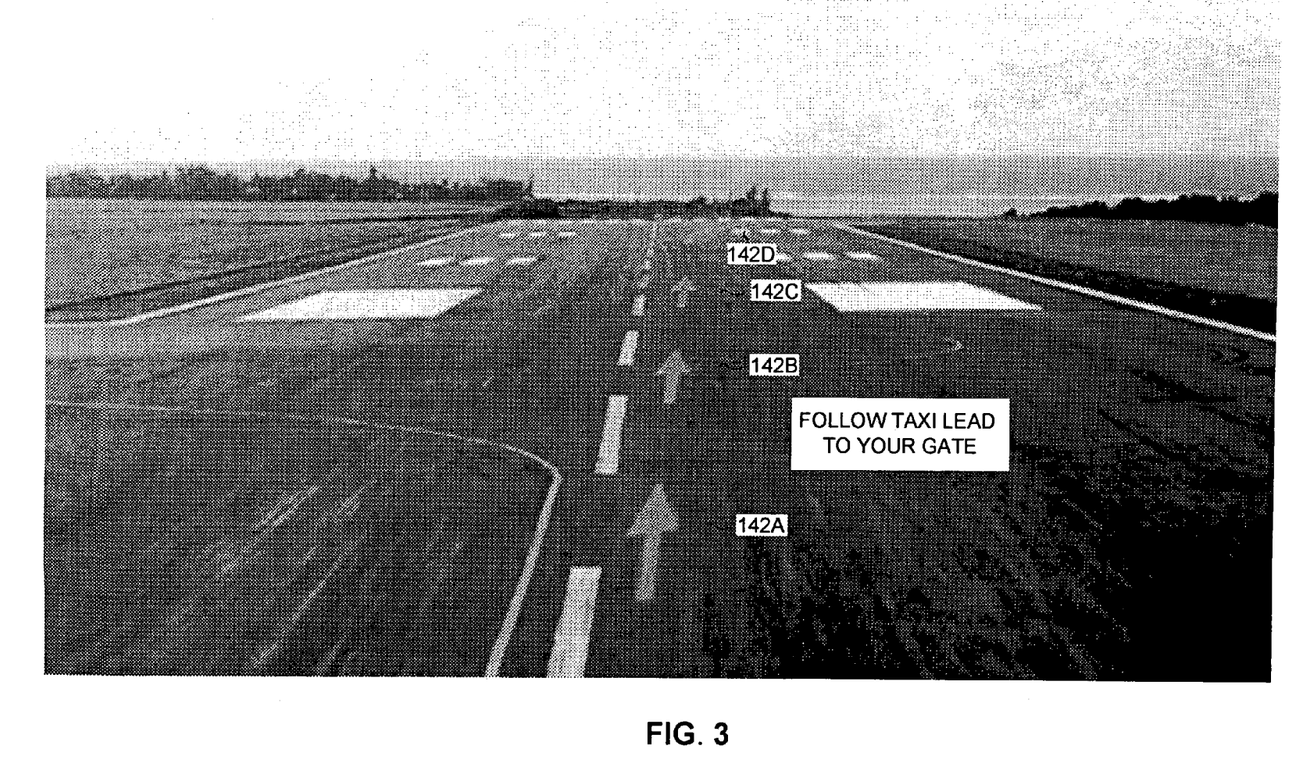
FIG. 3 is a schematic illustration of a taxiing route seen by the pilot through the HMD, constructed and operative in accordance with a further embodiment of the disclosed technique.

Reference is now made to FIG. 3, which is a schematic illustration of a taxiing route seen by the pilot through the HMD, constructed and operative in accordance with a further embodiment of the disclosed technique. The image displayed to the pilot includes a series of arrows, referenced 142A, 142B, 142C and 142D, superimposed along a path on the landing strip. The pilot sees arrows 142A, 142B, 142C and 142D in relation to the real world environment. The image also displays the textual information: "follow taxi lead to your gate". The pilot follows the instructions and proceeds along the path indicated by arrows 142A, 142B, 142C and 142D toward the gate. The visual representation of the taxiing route is clearly depicted on the projected image to the pilot, without obstructing the pilot view of the rest of the external environment.

According to one embodiment of the disclosed technique, the aircraft control operator can interact with the pilot respective of the spatial image being viewed through HMD 118. This enables the aircraft control operator to receive confirmation of any flight instructions or information being transmitted to the pilot, and ensure that both sides have the same frame of reference. In this manner, the aircraft control operator is guaranteed that the pilot fully and correctly understood the received flight instructions, thereby preventing possible errors that could result from misunderstood instructions, and enhancing overall flight safety.

The aircraft control operator prepares flight instructions, which relate to a particular object or region. For example, the aircraft control operator wishes to send a particular flight route to the pilot, or to send a warning that another aircraft is in dangerous proximity. The aircraft control operator sends the instructions to system 110 (e.g., transmitted over the data link of aircraft communication apparatus 106), which generates a visual representation of the instructions respective of the spatial image currently being displayed to the pilot. The objects or regions associated with the instructions (e.g., landmarks of the flight route, a landing destination, another aircraft in dangerous proximity) are marked on the visual representation. System 110 projects the visual representation of the flight instructions onto the current displayed spatial image (i.e., integrates the representation of the instructions into the representation of the spatial image, and displays the integrated representations). The pilot sees the instructions which are marked, indicating the particular object or region associated with the instructions. The pilot then indicates to the aircraft control operator that the marked object was viewed, by designating the marking on the display image via pilot communication interface 120. The designation is linked to the pilot line-of-sight, and then confirmed by the pilot by carrying out a specific action. For example, the designation may be confirmed verbally (e.g., speaking a predefined statement), or by tactile means (e.g., pressing a button when looking at an object, or graphically positioning a cursor onto an object), in conjunction with the line-of-sight determined by LOS detector 124. The aircraft control operator receives and checks the designation from the pilot (e.g., transmitted over the data link of aircraft communication apparatus 106). If the designated area is incorrect, the aircraft control operator can verify that the marked instructions were properly sent and resend the instructions if necessary. The aircraft control operator may also decide to communicate with the pilot, to try to ascertain why the instructions may not have been correctly understood, or to attempt to clarify any misunderstandings. If the designated area is correct, the pilot can proceed with carrying out the flight instructions.

Figure 4A:
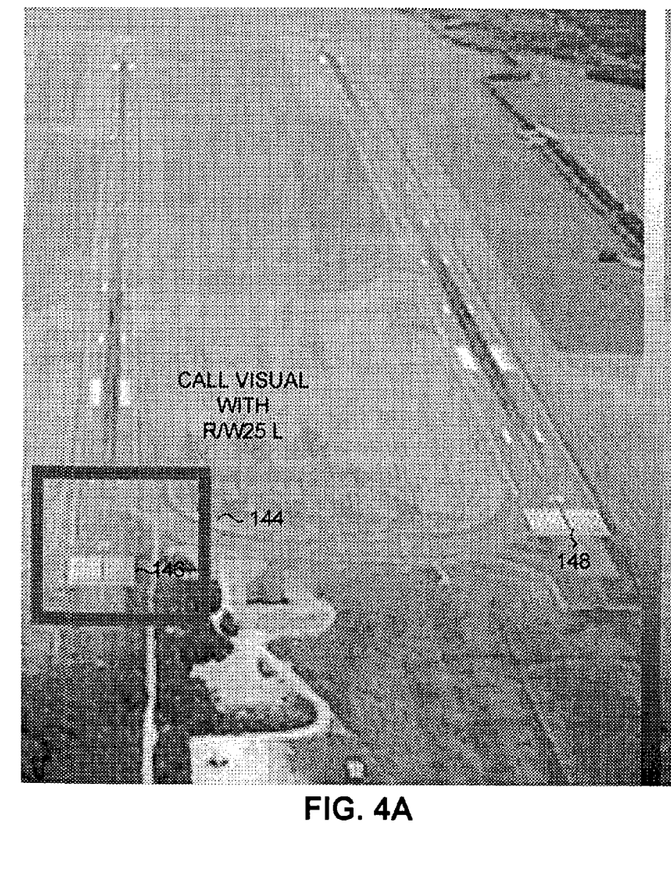
FIG. 4A is a schematic illustration of marked flight instructions respective of pre-landing approval, received by a pilot.
Figure 4B:
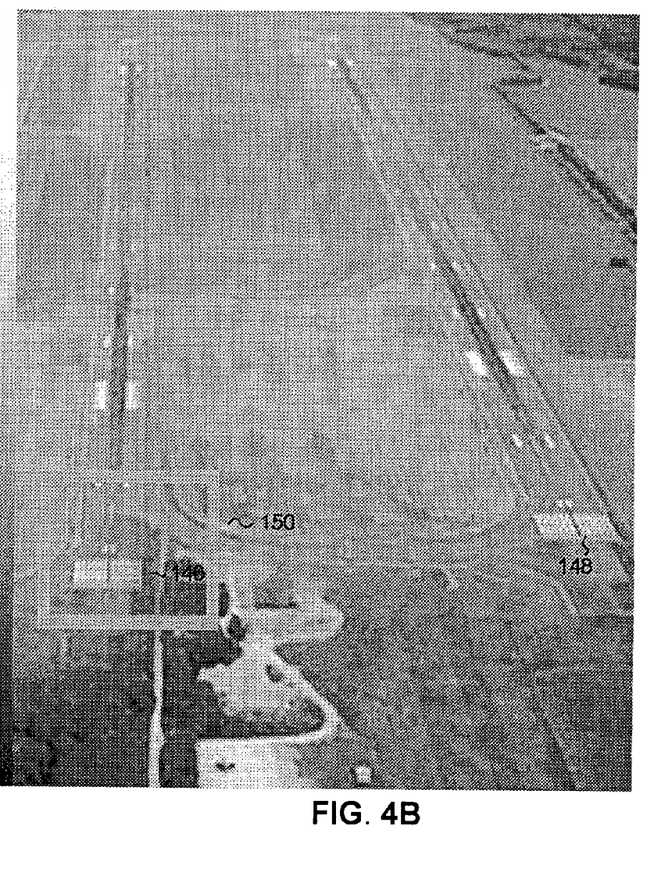
FIG. 4B is a schematic illustration of the marked flight instructions of FIG. 4A designated by the pilot.

Reference is now made to FIGS. 4A and 4B. FIG. 4A is a schematic illustration of marked flight instructions respective of pre-landing approval, received by a pilot. FIG. 4B is a schematic illustration of the marked flight instructions of FIG. 4A designated by the pilot. The pilot sees the displayed image along with a marking 144 on the left side of the image. Marking 144 is a box centered on a runway origin 146. Marking 144 is highlighted relative to the rest of the image, such as by being depicted in a unique and clearly visible color. The displayed image also includes the text information: "call visual with R/W 25L". The pilot views marking 144 together with the text, and deduces that the received instructions indicate approval for landing on runway 25L, where the marking is located. The pilot designates the marking 144 on the image, and the designation 150 (FIG. 4B) is received by the aircraft control operator. The aircraft control operator is thereby ensured that the pilot did not misunderstand the pre-landing approval, for example, by selecting the runway at runway origin 148 on the right side of the image. The pilot may then proceed with landing on the indicated runway. It is appreciated that the dark frame in FIG. 4A representing marking 144 is typically a different color than the light frame in FIG. 4B representing designation 150. After the pilot designates marking 144, the marking changes color, shape or form or otherwise presented differently, to provide a clear indication that the designation has been made.

Figure 5A:
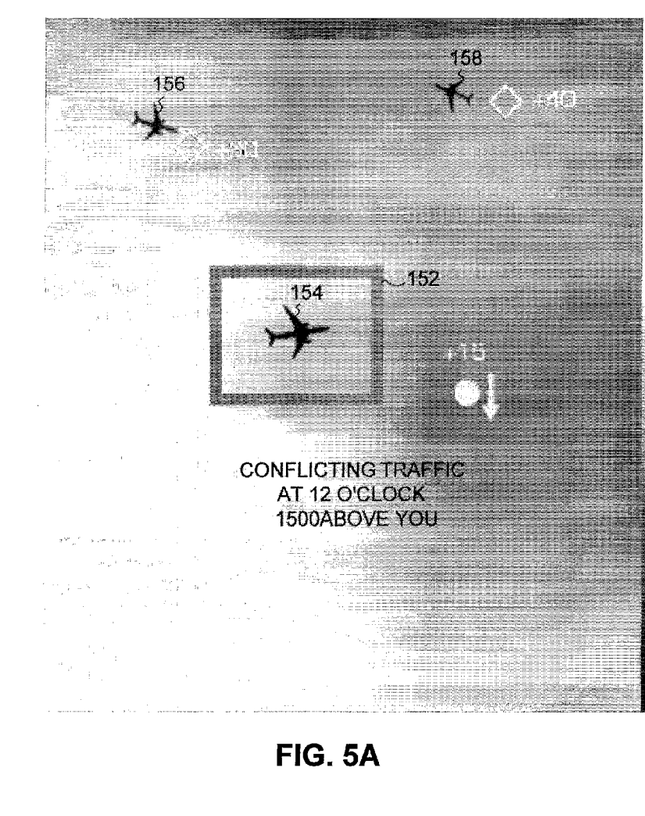
FIG. 5A is a schematic illustration of marked flight instructions respective of flight traffic, received by a pilot.
Figure 5B:
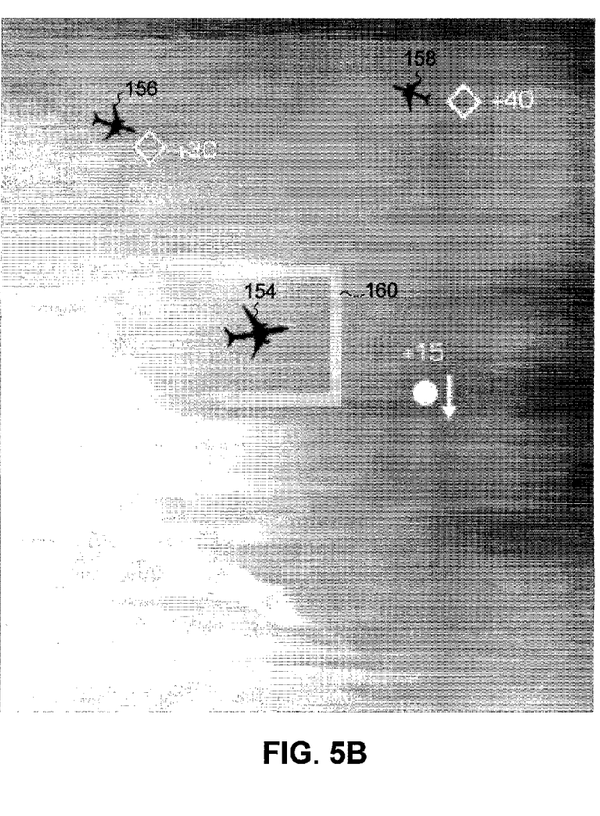
FIG. 5B is a schematic illustration of the marked flight instructions of FIG. 5A designated by the pilot.

Reference is now made to FIGS. 5A and 5B. FIG. 5A is a schematic illustration of marked flight instructions respective of flight traffic, received by a pilot. FIG. 5B is a schematic illustration of the marked flight instructions of FIG. 5A designated by the pilot. The image displayed to the pilot includes an aircraft 154 an aircraft 156 and an aircraft 158, which are all in the general vicinity. The displayed image includes a marking 152, in the form of a box centered on aircraft 154. The image also displays symbolic information generated by a data link system (e.g., an automatic dependent surveillance broadcast (ADSB)), such as maneuvering information: "+15↓" for the pilot to follow, as well as textual information: "conflicting traffic at 12 o'clock 1500 above you".

The pilot views marking 152 together with the text, and recognizes that the instructions indicate that aircraft 154 is in dangerous proximity and steps must be taken to avoid a conflict. The pilot designates marking 152 on the image, and the designation 160 (FIG. 5B) is received by the aircraft control operator. The designation 160 confirms that the pilot did not misunderstand the flight instructions to refer to aircraft 156 or aircraft 158.

Figure 6A:
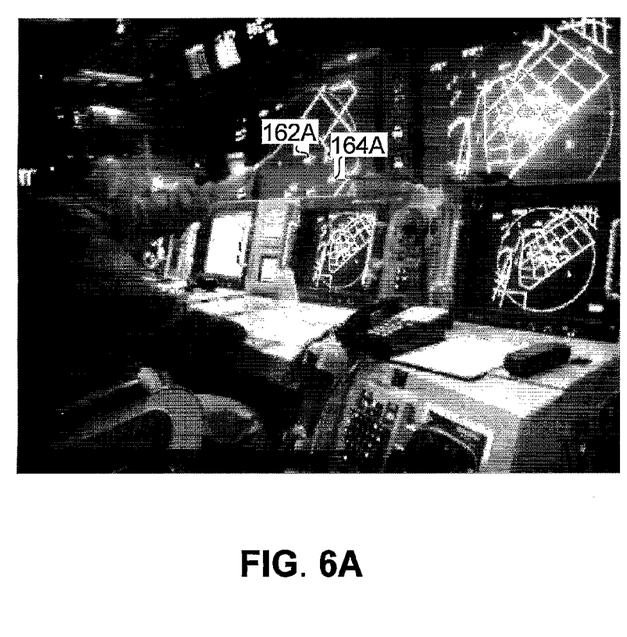
FIG. 6A is a schematic illustration of an aircraft control operator viewing data on a control screen.
Figure 6B:
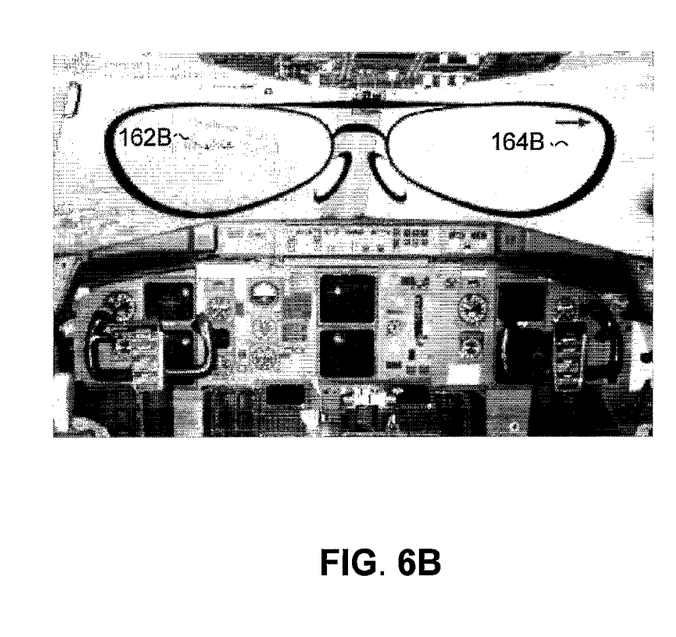
FIG. 6B is a schematic illustration of the view seen by the pilot in relation to the data of FIG. 6A.

Reference is now made to FIGS. 6A and 6B. FIG. 6A is a schematic illustration of an aircraft control operator viewing data on a control screen. FIG. 6B is a schematic illustration of the view seen by the pilot in relation to the data of FIG. 6A. The aircraft control operator sees aircrafts 162A and 164A on a radar system. The corresponding aircrafts are displayed by system 110 to the pilot through HMD 118 as aircrafts 162B and 164B, respectively. Both sides have visual access to the same data, albeit in a different representation. The pilot is provided with a visual representation which enables him to view the real world environment with minimal disturbance from supplemental information.

It is appreciated that the disclosed technique allows the aircraft control operator to transfer greater flight responsibility onto the pilot, freeing up more time for the aircraft control operator to handle other aircrafts and increasing the overall flight capacity. Moreover, the pilot spends less time awaiting directions from the aircraft control operator, which lowers the duration of the flight.

Figure 7:
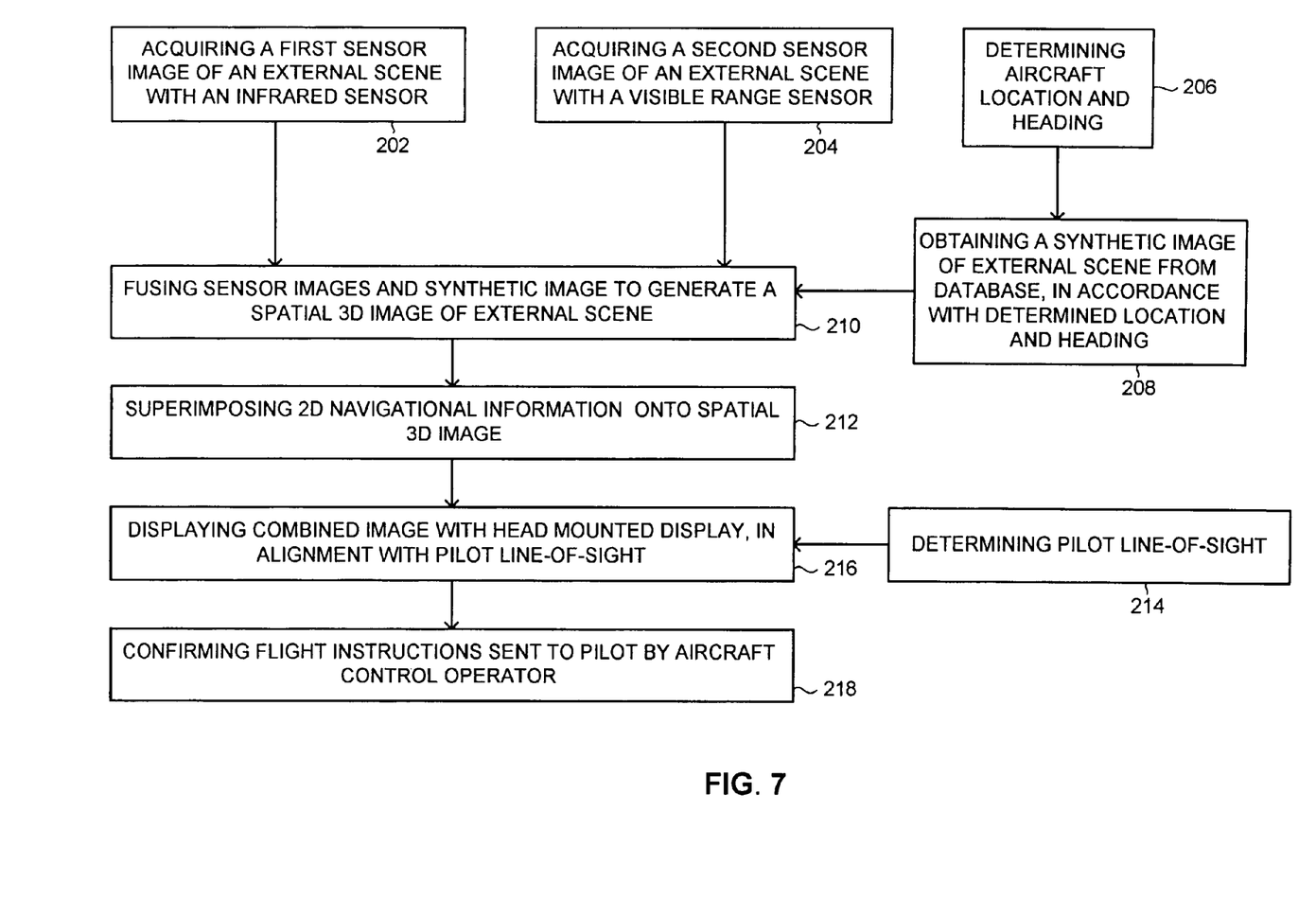
FIG. 7 is a block diagram of a method for assisting aircraft piloting, operative in accordance with an embodiment of the disclosed technique.

Reference is now made to FIG. 7, which is a block diagram of a method for assisting aircraft piloting, operative in accordance with an embodiment of the disclosed technique. In procedure 202, a first sensor image of an external scene is acquired with an infrared sensor. With reference to FIG. 1, IR sensor 114 acquires an image of the external environment surrounding the aircraft.

In an optional procedure 204, a second sensor image of an external scene is captured with a visible range sensor. With reference to FIG. 1, visible range sensor 116 acquires an image of the external environment surrounding the aircraft.

In procedure 206, the location and heading of the aircraft is determined. With reference to FIG. 1, processor 112 determines the current location and heading of the aircraft from flight and navigational information received by the aircraft navigational systems.

In procedure 208, a synthetic image of the external scene is obtained from a database, in accordance with the determined location and heading. With reference to FIG. 1, processor 112 obtains a synthetic image of the external environment from database 122, matching the current location and heading of aircraft 102.

In procedure 210, the sensor images and the synthetic image are fused to generate a spatial image of the external scene. With reference to FIG. 1, processor 112 fuses the images acquired by sensors 114 and 116, with the image obtained from database 122, and generates a single spatial image.

In procedure 212, symbolic information is superimposed onto the spatial image. With reference to FIG. 1, processor 112 superimposes additional symbolic information onto the fused spatial image.

In procedure 214, the line-of-sight of the pilot is determined. With reference to FIG. 1, LOS detector 124 determines the current line-of-sight of the pilot, by means of head-tracking device 126 and eye-tracking device 128.

In procedure 216, the combined spatial and symbolic image is displayed with the head-mounted display, in alignment with the pilot line-of-sight. With reference to FIG. 1, HMD 118 displays to the pilot the combined spatial image together with the superimposed symbolic information, aligned with the line-of-sight of the pilot as determined by LOS detector 124.

Figure 8:
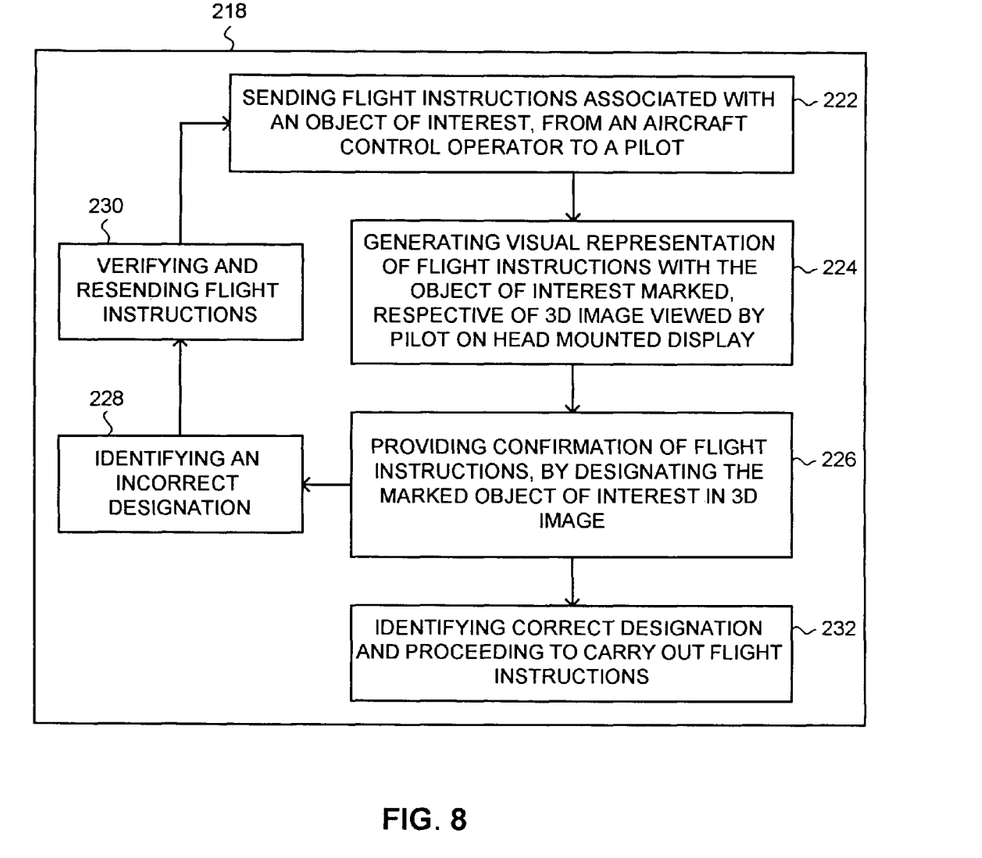
FIG. 8 is a block diagram of the procedure of confirming flight instructions in the method of FIG. 7.

In procedure 218, flight instructions sent to the pilot by the aircraft control operator are confirmed. Reference is now made to FIG. 8, which is a block diagram of the procedure of confirming flight instructions in the method of FIG. 7. In procedure 222, flight instructions associated with an object of interest are sent from an aircraft control operator to a pilot. With reference to FIG. 4A, the aircraft control operator sends flight instructions relating to pre-landing approval.

In procedure 224, a visual representation of the flight instructions with the object of interest marked is generated respective of the spatial image viewed by the pilot on the head-mounted display. With reference to FIG. 4A, system 110 receives the flight instructions related to pre-landing approval, and generates a spatial image with marking 144 superimposed on runway origin 146, along with text information. HMD 118 displays the visual representation of the flight instruction on the spatial image.

In procedure 226, confirmation of the flight instructions is provided, by designating the marked object of interest in the spatial image. With reference to FIG. 4B, the pilot designates the marked runway origin 146, and the designation 150 is communicated to the aircraft control operator.

In procedure 228, an incorrect designation is identified, and in procedure 230, the flight instructions are verified and resent. With reference to FIGS. 4A and 4B, if designation 150 received by the aircraft control operator is incorrect, the aircraft control operator verifies the flight instructions that were sent, and resends them if necessary.

In procedure 232, a correct designation is identified, and the flight instructions are carried out. With reference to FIGS. 4A and 4B, if designation 150 received by the aircraft control operator is correct, the pilot obtains confirmation to proceed with landing at runway 25L.

It will be appreciated by persons skilled in the art that the disclosed technique is not limited to what has been particularly shown and described hereinabove.

The invention claimed is:

1. An enhanced vision system for enabling a pilot of an aircraft to confirm flight instructions received from an aircraft control operator operating in an aircraft control station, the system comprising:

a line-of-sight detector, for determining the line-of-sight of the pilot of said aircraft;

a head mounted display (HMD) worn by said pilot, for displaying images and information to said pilot;

an aircraft communication apparatus operable to transmit to said pilot flight instructions associated with an object of interest from said aircraft control operator, and to transmit to said aircraft control operator a confirmation of said flight instructions from said pilot;

a processor, coupled with said HMD, said light-of-sight detector, and said aircraft communication apparatus, said processor operable to generate a visual representation of said flight instructions with said object of interest marked, respective of a combined spatial and symbolic image viewed by said pilot on said HMD in alignment with the determined line-of-sight; and a pilot communication interface, coupled with said processor, said pilot communication interface configured to receive said confirmation in which said pilot designates said marked object of interest on said combined spatial and symbolic image by verbal or tactile means, the designation being linked to said determined line-of-sight of said pilot, wherein the designation as linked to the determined line-of-sight of the pilot is transmitted to the aircraft control operator via the aircraft communication apparatus, such that if the designation is incorrect, the flight instructions are configured to be resent or communications are configured to be initiated with the pilot via the aircraft communication apparatus.

2. The system according to claim 1, wherein if a correct designation is identified, said pilot proceeds to carry out said flight instructions.

3. The system according to claim 1, wherein said pilot communication interface is selected from the list consisting of:
- a microphone;
- an audio speaker;
- an intercom;
- a radio;
- an integrated headset;
- a text message interface; and
- a graphical user interface.

4. The system according to claim 1, wherein said pilot communication interface is incorporated within said HMD.

5. The system according to claim 1, wherein said aircraft communication apparatus comprises a data link, said data link being operative to provide said flight instructions to said pilot from an aircraft control station, and to provide pilot confirmation of said flight instructions to said aircraft control station.

6. The system according to claim 1, wherein said combined spatial and symbolic image comprises symbolic information respective of the piloting of said aircraft superimposed onto a spatial image of the external scene to said aircraft.

7. The system according to claim 6, wherein said spatial image comprises at least one selected from the list consisting of:
- a sensor image, acquired with at least one image sensor; and
- a synthetic image, obtained from a database.

8. The system according to claim 7, further comprising a directing unit coupled with said at least one image sensor and with said line-of-sight detector, for directing said at least one image sensor according to said determined line-of-sight in real-time.

9. The system according to claim 7, wherein said at least one image sensor operates in the spectrum range selected from the list of ranges consisting of:
- 0.5-1.7 μm;
- the near infrared and visible wavelengths;
- 3-5 μm; and
- 8-12 μm.

10. The system according to claim 7, wherein said at least one image sensor is selected from the list consisting of:
- an infrared (IR) camera; and
- a visible range camera.

11. The system according to claim 6, further comprising at least one image sensor coupled with said processor, for acquiring a sensor image, wherein said spatial image comprises said sensor image.

12. The system according to claim 6, further comprising a database, coupled with said processor, said database containing image information for generating a synthetic image, wherein said spatial image comprises said synthetic image.

13. The system according to claim 12, wherein said synthetic image is selected in accordance with the location and the heading of said aircraft.

14. The system according to claim 6, further comprising:
- at least one image sensor coupled with said processor, for acquiring a sensor image of the external scene to said aircraft;
- a database coupled with said processor, said database containing image information for generating a synthetic image,
- wherein said spatial image is combined selectively from said sensor image and said synthetic image.

15. The system according to claim 14, wherein said spatial image comprises only said sensor image whenever said sensor image meets a first threshold criteria.

16. The system according to claim 15, wherein said spatial image comprises either a combination of said sensor image and said synthetic image, or only said synthetic image, whenever said sensor image fails to meet said first threshold criteria.

17. The system according to claim 16, wherein said spatial image comprises only said synthetic image, whenever said sensor image fails to meet a second threshold criteria lower than said first threshold criteria.

18. The system according to claim 6, wherein said symbolic information is selected from the list consisting of:
- location of said aircraft;
- heading of said aircraft;
- altitude of said aircraft;
- velocity of said aircraft;
- air speed;
- ground speed;
- wind velocity;
- vertical speed indicator (VSI);
- VHF Omnidirectional Range (VOR) indicator;
- engine status;
- presence of objects in the vicinity of said aircraft;
- landing destination;
- a flight route;
- a landing route;
- a take-off route; and
- a taxiing route.

19. The system according to claim 1, wherein said HMD is selected from the list consisting of:
- a helmet;
- a visor;
- spectacles; and
- goggles.

20. The system according to claim 1, wherein said line-of-sight detector is selected from the list consisting of:
- a head-tracking device; and
- an eye tracking device.

21. A method for enabling a pilot of an aircraft to confirm flight instructions received from an aircraft control operator operating in an aircraft control station, the method comprising the procedures of:
- determining the line-of-sight of said pilot using a line-of-sight detector;
- sending flight instructions associated with an object of interest, from said aircraft control operator to said pilot;
- generating a visual representation of said flight instructions with said object of interest marked, respective of a combined spatial and symbolic image viewed by said pilot on an HMD in alignment with the determined line-of-sight;
- receiving a confirmation of said flight instructions at a pilot communication interface in which said pilot designates said marked object of interest on said combined spatial and symbolic image by verbal or tactile means, the designation being linked to said determined line-of-sight of said pilot; and
- transmitting the designation as linked to the determined line-of-sight of the pilot to the aircraft control operator, such that if the designation is incorrect, the flight instructions are configured to be resent or communications are configured to be initiated with the pilot.

22. The method according to claim 21, further comprising the procedure of:
- if a correct designation is identified, said pilot proceeds to carry out said flight instructions.

23. The method according to claim 21, wherein said combined spatial and symbolic image is selected from the list consisting of:
- a flight route;
- a landing route;
- a take-off route; and
- a taxiing route.

24. The method according to claim 21, wherein said flight instructions are sent to said pilot over a data link, and wherein said confirmation is provided to said aircraft control operator over said data link.

* * * * *